(12) United States Patent
Kikkawa et al.

(10) Patent No.: US 11,558,283 B2
(45) Date of Patent: Jan. 17, 2023

(54) INFORMATION COLLECTING SYSTEM AND INFORMATION COLLECTING METHOD

(71) Applicant: Nippon Telegraph and Telephone Corporation, Tokyo (JP)

(72) Inventors: Takamichi Kikkawa, Musashino (JP); Hiroshi Osawa, Musashino (JP); Satoshi Nishiyama, Musashino (JP); Masayuki Nishiki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 196 days.

(21) Appl. No.: 16/969,269

(22) PCT Filed: Feb. 14, 2019

(86) PCT No.: PCT/JP2019/005394
§ 371 (c)(1),
(2) Date: Aug. 12, 2020

(87) PCT Pub. No.: WO2019/160050
PCT Pub. Date: Aug. 22, 2019

(65) Prior Publication Data
US 2021/0006488 A1    Jan. 7, 2021

(30) Foreign Application Priority Data

Feb. 15, 2018  (JP) .............................. JP2018-025431

(51) Int. Cl.
*H04L 45/16* (2022.01)
*H04L 45/302* (2022.01)
(Continued)

(52) U.S. Cl.
CPC .......... *H04L 45/16* (2013.01); *H04L 45/3065* (2013.01); *H04L 45/34* (2013.01); *H04L 45/74* (2013.01); *H04L 47/34* (2013.01)

(58) Field of Classification Search
None
See application file for complete search history.

(56) References Cited

U.S. PATENT DOCUMENTS 9,241,277 B2 *  1/2016  Kozisek ................. H04L 41/142
9,985,872 B2 *  5/2018  Jaffer .................... H04L 67/142
(Continued)

FOREIGN PATENT DOCUMENTS

JP    H05336166    12/1993
JP    H11-41281    2/1999
(Continued)

OTHER PUBLICATIONS

Allot.com, [online], "Allot Digital Lifestyle Services—Subscriber Management Platform," 2014, retrieved on Dec. 11, 2017, retrieved from URL<http://www.allotworks.com/datasheets/DS_SMP_rev8_A4_LR_Publish.pdf>, 4 pages.
(Continued)

*Primary Examiner* — Gerald A Smarth
(74) *Attorney, Agent, or Firm* — Fish & Richardson P.C.

(57) ABSTRACT

A counter router (20) assigns predetermined information specifying a terminal (40) and a sequence number according to the predetermined information to a packet which is received and destined for the terminal (40). Further, the counter router (20) transfers the packet to which the predetermined information and the sequence number are assigned, to a subscriber accommodation router (10) via a relay device. Further, the subscriber accommodation router (10) stores, in an aggregation server (30), the predetermined information and the sequence number which are assigned to the packet transferred from the counter router (20).

14 Claims, 14 Drawing Sheets

(51) Int. Cl.
*H04L 45/00* (2022.01)
*H04L 45/74* (2022.01)
*H04L 47/34* (2022.01)

(56) References Cited

U.S. PATENT DOCUMENTS

| | | | | |
|---|---|---|---|---|
| 2003/0012202 A1* | 1/2003 | Fukutomi | ............. | H04L 12/185 370/395.3 |
| 2008/0084884 A1* | 4/2008 | Bahattab | ................. | H04L 45/00 370/392 |
| 2010/0008363 A1* | 1/2010 | Ee | ........................... | H04L 45/72 370/392 |

FOREIGN PATENT DOCUMENTS

| | | |
|---|---|---|
| JP | 2006148784 | 6/2006 |
| JP | 2007-53667 | 3/2007 |
| WO | WO 2016/132429 | 8/2016 |

OTHER PUBLICATIONS

Cisco.com, [online], "IPv6 Network Management Configuration Guide, Cisco IOS Release 15M&T," Aug. 2, 2016, retrieved on Feb. 5, 2018, retrieved from URL<https://www.cisco.com/c/en/us/td/docs/ios-xml/ios/ipv6_nman/configuration/15-mt/ip6n-15-mt-book/ioam-ipv6.html>, 43 pages.

* cited by examiner

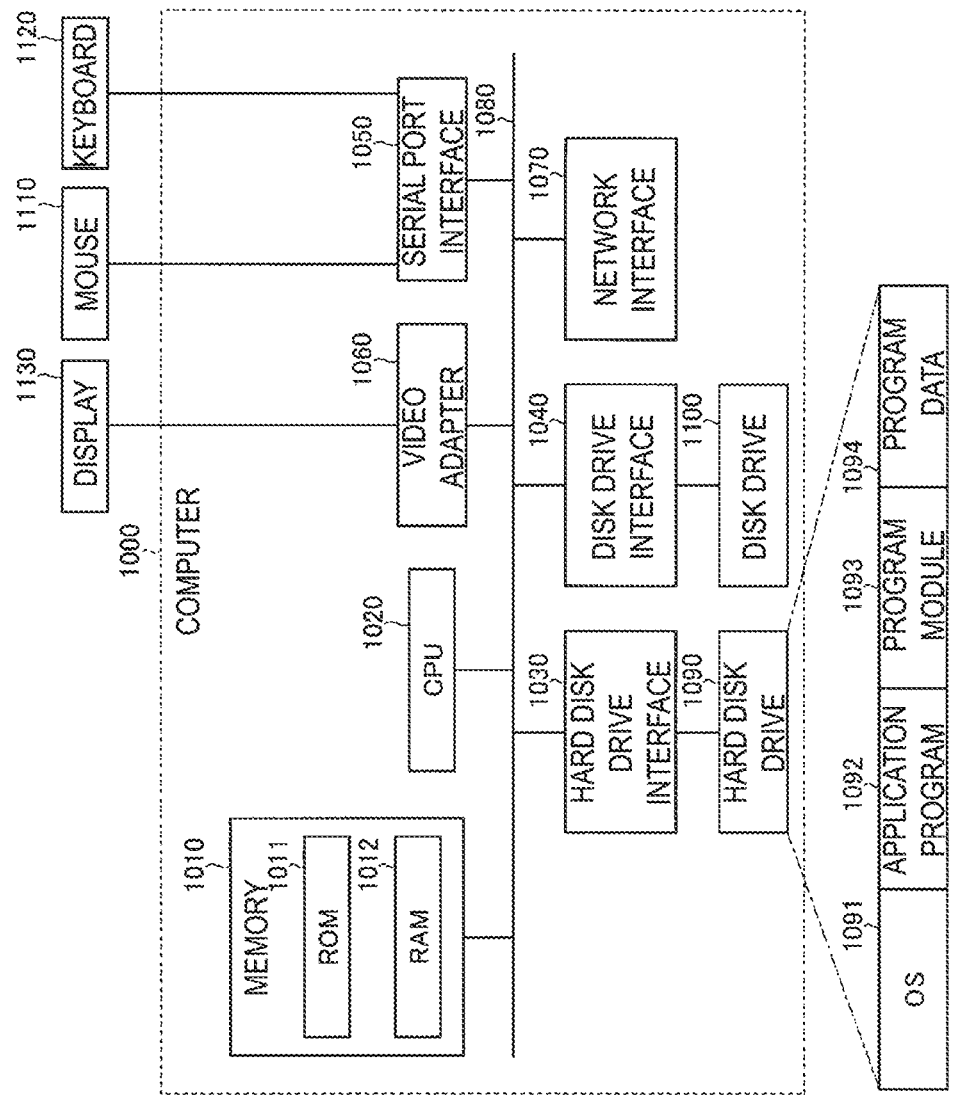

INFORMATION COLLECTING SYSTEM AND INFORMATION COLLECTING METHOD

CROSS-REFERENCE TO RELATED APPLICATIONS

This application is a National Stage application under 35 U.S.C. § 371 of International Application No. PCT/JP2019/005394, having an International Filing Date of Feb. 14, 2019, which claims priority to Japanese Application Serial No. 2018-025431, filed on Feb. 15, 2018. The disclosure of the prior application is considered part of the disclosure of this application, and is incorporated in its entirety into this application

TECHNICAL FIELD

The present disclosure relates to an information collection system and an information collection method.

BACKGROUND ART

Techniques for identifying and managing subscribers from IP packets are typically known. IP address-based subscriber identification methods are known (for example, see Non Patent Literature 1). in addition, methods of identifying subscribers by associating with a radius server and a DHCP server are known (for example, see Non Patent Literature 2).

CITATION LIST

Non Patent Literature

Non Patent Literature 1: IPv6 Network Management Configuration Guide, Cisco IOS Release 15 M & T, [online], [Search on Feb. 5, 2018], Internet (https://www.cisco.com/c/en/us/td/docs/ios-xml/ios/ipv6_nman/configuration/15-mt/ip6n-15-mt-book/ioam-ipv6.html)
Non Patent Literature 2: Allot Digital Lifestyle Services Subscriber Management Platform, [online], [Search on Dec. 11, 2017], Internet (http://www.allot.corn/wp-content/uploads/DS_SMP_rev8_A4_LR_Publish.pd1)

SUMMARY OF THE INVENTION

Technical Problem

However, the known technique has a problem that it may be difficult to easily understand the status of packet loss for each subscriber. For example, because the IP address assigned to the subscriber changes dynamically, the method described in Non Patent Literature 1 may not he able to accurately identify the subscriber from the IP packet. In addition, in order to perform the method described in Non Patent Literature 2, it may be necessary to add functions associated with a radius server and a DHCP server to an existing network system, and it may not be easy to develop in terms of cost.

Means for Solving the Problem

In order to solve the above problems and achieve the object, an information collection system of the present disclosure is an information collection system having a first edge router and a second edge router and collecting information on a network accommodating a terminal of a user, the information collection system including an assigning unit configured to assign predetermined information specifying the terminal and a sequence number according to the predetermined information to a packet received by the first edge router, the packet having the terminal as a source or a destination; a transfer unit configured to transfer the packet to which the predetermined information and the sequence number are assigned by the assigning unit, from the first edge router to the second edge router via a relay device; and a storage unit configured to store, in a memory unit, the predetermined information and the sequence number assigned to the packet, which is transferred by the transfer unit and received by the second edge router.

Effects of the Invention

According to the present disclosure, it is possible to easily understand the status of packet loss for each subscriber.

BRIEF DESCRIPTION OF DRAWINGS

FIG. 14 is a diagram illustrating an example of a computer executing an information collection program.

DESCRIPTION OF EMBODIMENTS

Embodiments of an information collection system and an information collection method according to the present application will be described below in detail based on the drawings. Note that the present disclosure is not limited to the embodiments described below

First Embodiment

Configuration of System of First Embodiment

Figure 1:
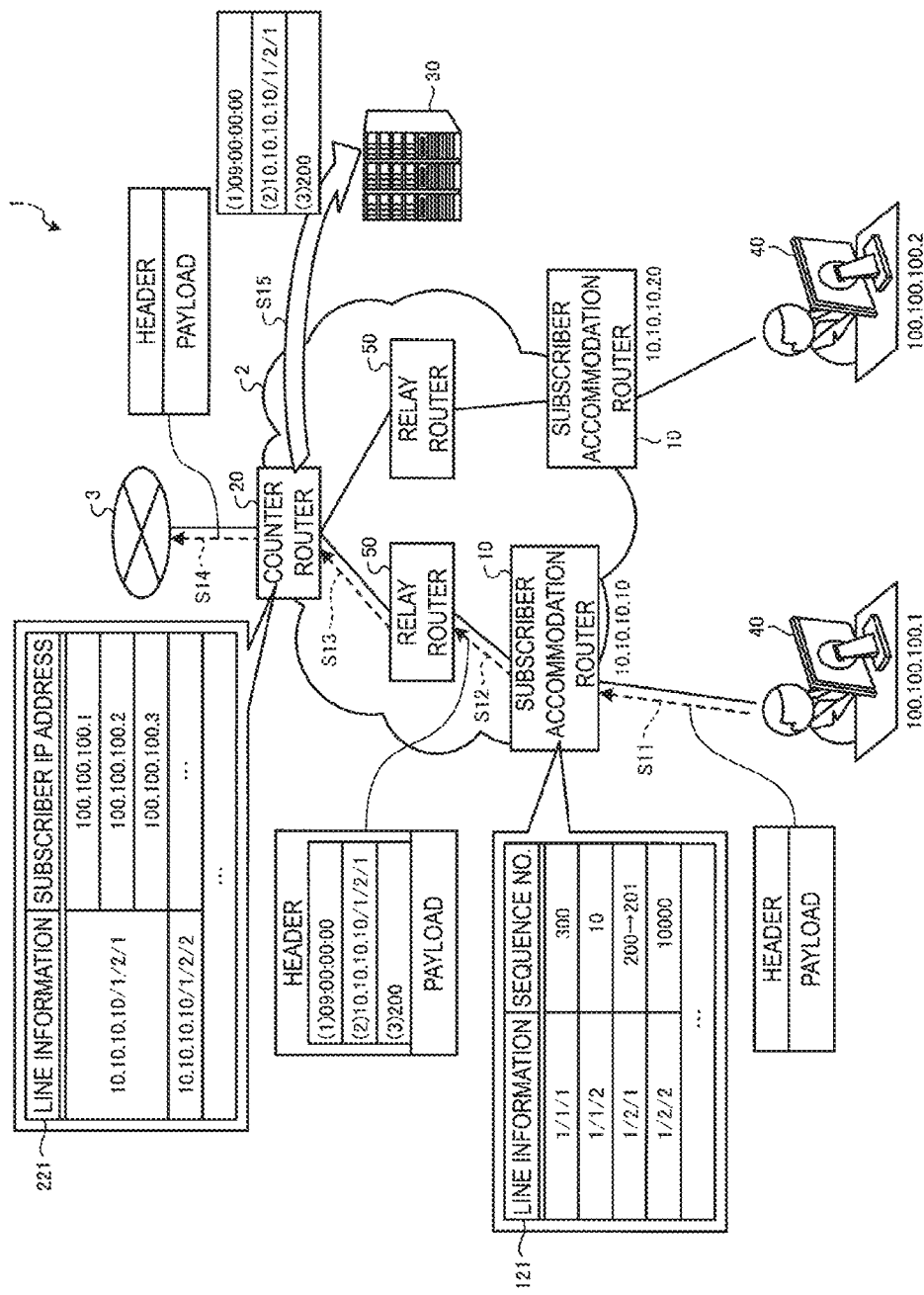
FIG. 1 is a diagram illustrating processing on uplink traffic in an information collection system according to a first embodiment.

First, a configuration of an information collection system according to a first embodiment will be described using FIG. 1, As illustrated in FIG. 1, the information collection system I has a subscriber accommodation router 10 and a counter router 20 that are edge routers of the network 2. The network 2 is an IP network. The information collection system 1 also includes an aggregation server 30 capable of transmitting and receiving data to and from the subscriber accommodation router 10 and the counter router 20. The aggregation server 30 may or may not be connected to the network 2.

The subscriber accommodation router 10 accommodates the terminal 40 of the subscriber in addition, the counter router 20 faces an external network 3. Further, a relay router 50 is provided between the subscriber accommodation router 10 and the counter router 20. The relay router 50 is a relay device relaying the transmission and reception of packets between the subscriber accommodation router 10 and the counter router 20.

Processing on Uplink Traffic in First Embodiment

Here, processing on uplink traffic by the information collection system 1 will be described using FIG. 1. FIG. 1 is a diagram illustrating processing on uplink traffic in the information collection system according to the first embodiment. Here, "uplink traffic" refers to the traffic when packets transmitted from the terminal 40 of the subscriber are transferred to the network 3 via the network 2.

As illustrated in FIG. 1, first, the terminal 40 transmits a packet to the subscriber accommodation router 10 (step S11). At this time, a packet consists of a header and a payload according to the general IP protocol.

Here, the subscriber accommodation router 10 refers to line information between the terminal 40 and the subscriber accommodation router 10, and increments the sequence number according to the line information. Note that the subscriber accommodation router 10 stores the sequence number and line information in association with each other, as sequence information 121. For example, the line information is NAS-PORT information. NAS-PORT Information includes IP addresses, transmission Slot ID, Port ID, and ULAN ID of the subscriber accommodation router 10. For example, NAS-PORT information is represented as "transmission Slot ID/Port ID/ULAN ID". In the example of FIG. 1, the subscriber accommodation router 10 specifies that NAS-PORT information in between the source terminal 40 of the transmitted packet and the subscriber accommodation router 10 is "1/2/1" and increments the sequence number from "200" to "201".

Then, the subscriber accommodation router 10 assigns the sequence number before increment to the packet together with the timestamp and line information, and transfers the packet to the counter router 20 (step S12), In the following description, a timestamp, a sequence number, and line information may be referred to as In-band Network Telemetry (INT) information. In the example of FIG. 1, the subscriber accommodation router 10, as INT information, assigns a timestamp "09:00:00:00", line information "10.10.10.10/1/2/1", and a sequence number "200" to the header of the packet.

The relay router 50 transfers the packet that has been transferred from the subscriber accommodation router 10 to the counter router 20 (step S13). Here, when the relay router 50 transfers the packet, packet loss may occur. The information collection system 1 may collect information in order to understand the occurrence status of packet loss for each terminal of the subscriber of the source of the packet.

Here, the counter router 20 stores the source IP address of the packet that has been transferred and the line information assigned to the packet in association with each other, as subscriber information 221. INT information is deleted from the packet and transferred to the network 3 (step S14). In addition, the counter router 20 stores the INT information that has been assigned to the packet in the aggregation server 30 (step S15).

Processing on Downlink Traffic in First Embodiment

Figure 2:
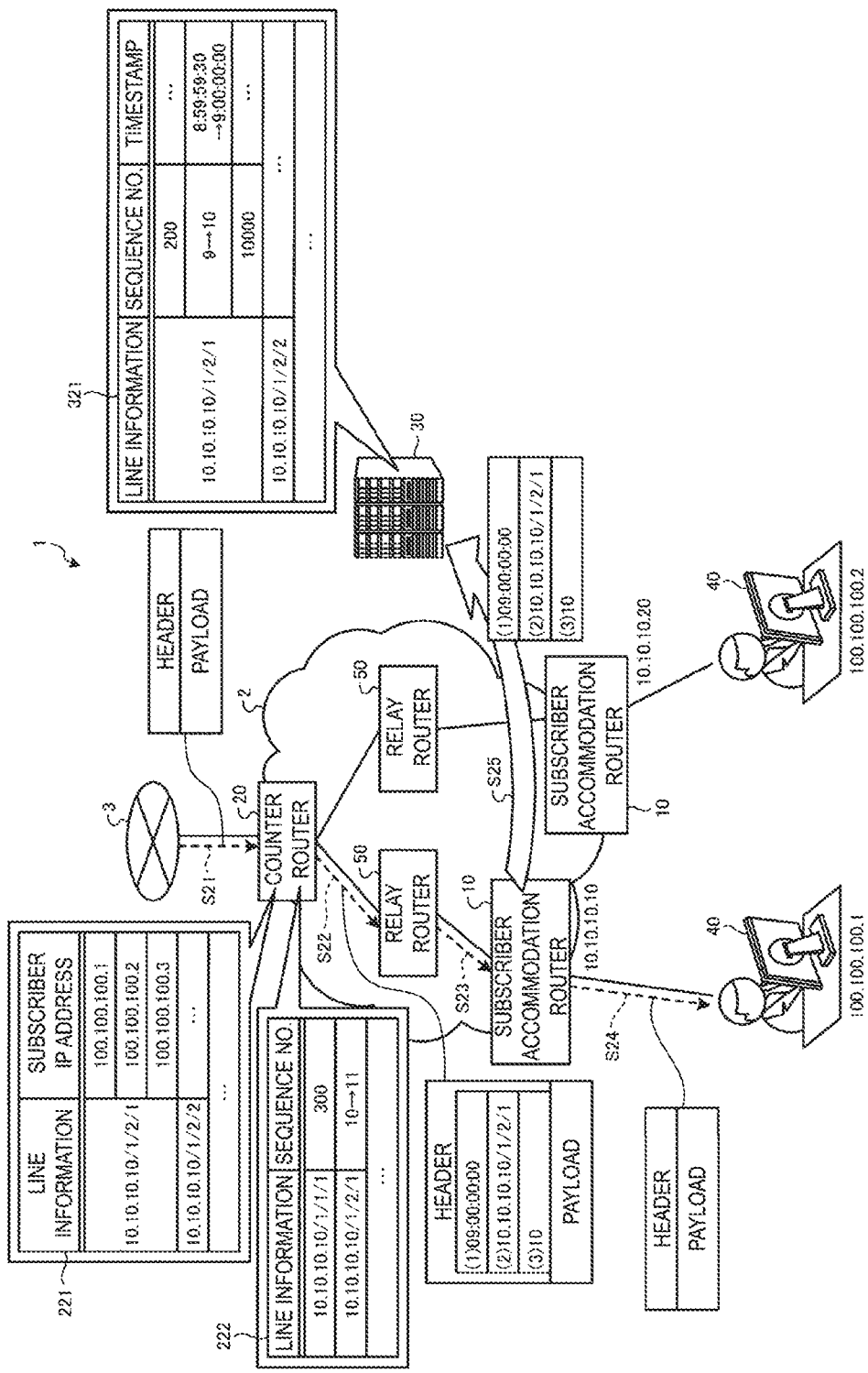
FIG. 2 is a diagram illustrating processing on downlink traffic in the information collection system according to the first embodiment.

Next, processing on downlink traffic in the information collection system 1 will be described using FIG. 2. FIG. 2 is a diagram illustrating processing on downlink traffic in the information collection system according to the first embodiment. Here, "downlink traffic" refers to the traffic when packets transmitted from the external network 3 are transferred to the terminal 40 of the subscriber via the network 2.

As illustrated in FIG. 2, first, the counter router 20 receives packets from the network 3 (step S21). At this time, a packet consists of a header and a payload according to the general IP protocol.

Here, the counter router 20 refers to the subscriber information 221, and specifies the corresponding line information, with the destination IP address of the received packet as the subscriber IP address. Then, the counter router 20 increments the sequence number corresponding to the specified line information. Note that the counter router 20 stores the sequence number and line information in association with each other as sequence information 222. In the example of FIG. 2, the counter router 20 specifies that NAS-PORT information in between the destination terminal 40 of the received packet and the counter router 20 is "10.10.10.10/1/2/1" and increments the sequence number from "10" to "11."

Then, the counter router 20 assigns the sequence number before increment to the packet together with timestamp and line information, and transfers the packet to the subscriber accommodation router 10 (step S22). In the example of FIG. 2, the counter router 20, as INT information, assigns a timestamp "09:00:00:00", line information "10.10.10.10/1/2/1" and a sequence number "10" to the header of the packet.

The relay router 50 further transfers the packet that has been transferred from the counter router 20 to the subscriber accommodation router 10 (step S23). Here, as in the case of uplink traffic, when the relay router 50 transfers the packet, packet loss may occur.

Then, the subscriber accommodation router 10 deletes INT information from the packet that has been transferred and transfers the packet to the terminal 40 (step S24). In addition, the subscriber accommodation router 10 stores the INT information that has been assigned to the packet in the aggregation server 30 (step S25).

The aggregation server 30 stores the transferred INT information as aggregation information 321, The aggregation server 30 can update the registered INT information with the sequence number and timestamp of INT information received from the counter router 20 or the subscriber accommodation router 10.

The aggregation server 30 may determine whether or not the sequence number of INT information received from the counter outer 20 or the subscriber accommodation router 10 is continuous with the registered sequence number. In the case of a determination that the sequence number is not continuous, the aggregation server 30 may notify the administrator or its equivalent of the alert.

Configuration of Each Apparatus in First Embodiment

Figure 3:
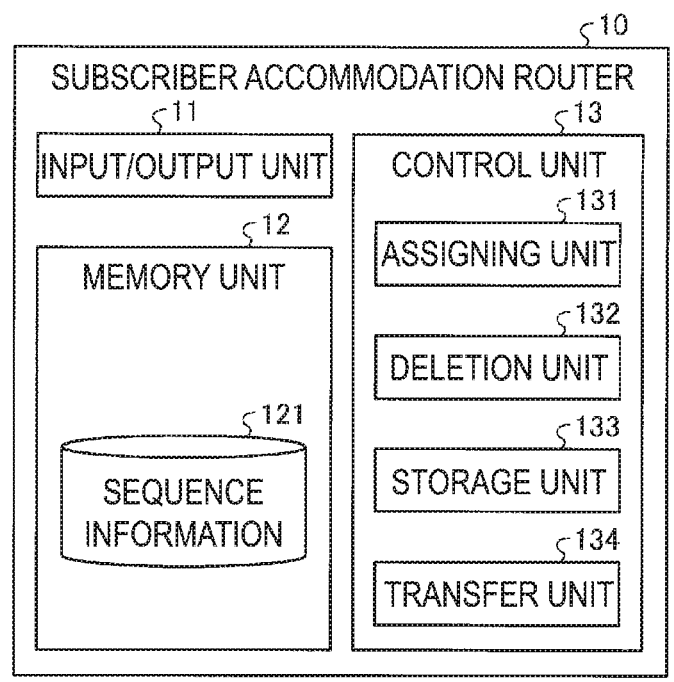
FIG. 3 is a diagram illustrating a configuration example of a subscriber accommodation router according to the first embodiment.

The configuration of the subscriber accommodation router 10 will be described using FIG. 3. FIG. 3 is a diagram illustrating a configuration example of the subscriber accommodation router according to the first embodiment. As illustrated in FIG. 3, the subscriber accommodation router 10 includes an input/output unit 11, a memory unit 12, and a control unit 13.

The input/output unit I1 exchanges data with other apparatuses. For example, the input/output unit 11 can accept the input of the packet via the network and transmit the packet. For example, the input/output unit 11 is a Network Interface Card (NIC).

The memory unit 12 is a storage device such as a Hard Disk Driver (HDD), a Solid State Drive (SSD), and an optical disk. Note that the memory unit 12 may be a semiconductor memory capable of rewriting data, such as a Random Access Memory (RAM), a flash memory, and a Non Volatile Static Random Access Memory (NVSRAM). The memory unit 12 stores an Operating System (OS) and various programs executed by the subscriber accommodation router 10. Further, the memory unit 12 stores various types of information used in the execution of the program, The memory unit 12 stores the sequence information 121. An example of the data configuration of the sequence information 121 is illustrated in FIG. 1.

The control unit 13 controls the entire subscriber accommodation router 10. The control unit 13 may be an electronic circuit such as a Central Processing Unit (CPU), and a Micro Processing Unit (MPU), or an integrated circuit such as an Application Specific Integrated Circuit (ASIC), and a Field Programmable Gate Array (FPGA). The control unit 13 includes an internal memory for storing programs defining various processing procedures and control data, and executes each of the processes by using the internal memory. Further, the control unit 13 functions as various processing units by operating various programs. For example, the control unit 13 includes an assigning unit 131. a deletion unit 132. a storage unit 133, and a transfer unit 134.

The assigning unit 131 assigns predetermined information specifying the terminal 40 and a sequence number according to the predetermined information to a packet, which is received by the subscriber accommodation router 10, using the terminal 40 as the source. The predetermined information may be information specifying a line between the terminal 40 and the subscriber accommodation router 10. For example, the assigning unit 131 assigns NAS-PORT information in between the terminal 40 and an edge router accommodating the terminal 40 and a sequence number according to the NAS-PORT information. The TNT information is information in which the predetermined information, the sequence number, and the timestamp are combined.

The deletion unit 132 deletes the information assigned to the packet. For example, the deletion unit 132 deletes the INT information assigned to the packet. Note that the information deleted from the packet by the deletion unit 132 may be used in other processing units of the subscriber accommodation router 10.

The storage unit 133 stores, in the aggregation server 30, the predetermined information and the sequence numbers assigned to the packets which are transferred by the counter router 20 and received by the subscriber accommodation router 10.

The transfer unit 134 transfers the packets to which the predetermined information and the sequence numbers are assigned by the counter router 20, from the subscriber accommodation router 10 to the counter router 20 via the relay router 50.

Figure 4:
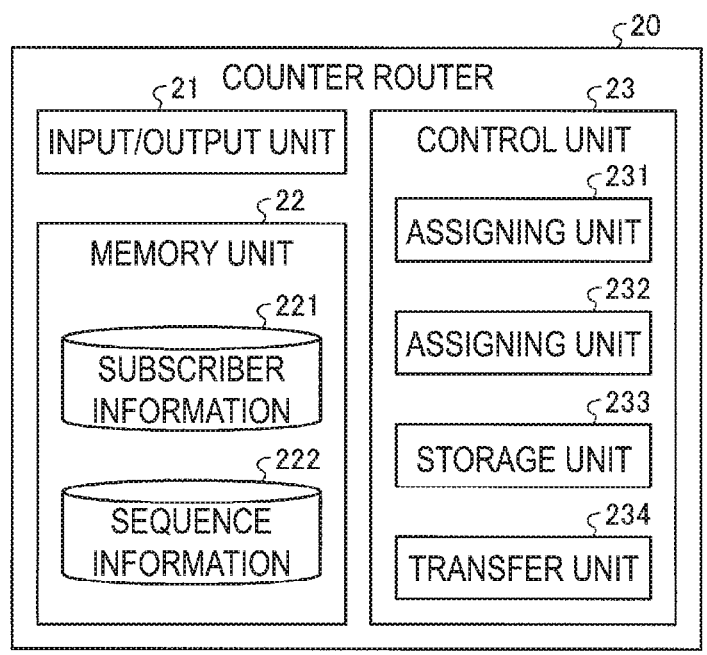
FIG. 4 is a diagram illustrating a configuration example of a counter router according to the first embodiment.

The configuration of the counter router 20 will be described using FIG. 4. FIG. 4 is a diagram illustrating a configuration example of the counter router according to the first embodiment. As illustrated in FIG. 4, the counter router 20 includes an input/output unit 21, a memory unit 22, and a control unit 23.

The input/output unit 21 exchanges data with other apparatuses. For example, the input/output unit 21 can accept the input of the packet via the network and transmit the packet. For example, the input/output unit 21 is an NIC.

The memory unit 22 is a storage apparatus such as a HDD, an SSD, or an optical disk. Note that the memory unit 22 may be a semiconductor memory capable of rewriting data, such as a RAM, a flash memory, or an NVSRAM. The memory unit 22 stores OS and various programs executed by the counter router 20. Further, the memory unit 22 stores various types of information used in the execution of the program. The memory unit 22 stores the subscriber information 221 and the sequence information 222. Examples of the data configuration of the subscriber information 221 and the sequence information 222 are as illustrated in FIG. 1 and FIG. 2.

The control unit 23 controls the entire counter router 20. The control unit 23 is, for example, an electronic circuit such as a CPU, and an MPU, or an integrated circuit such as an ASIC, and a FPGA. The control unit 23 includes an internal memory for storing programs defining various processing procedures and control data, and executes each of the processes by using the internal memory. Further, the control unit 23 functions as various processing units by operating various programs. For example, the control unit 23 includes an assigning unit 231, a deletion unit 232, a storage unit 233, and a transfer unit 234.

The assigning unit 231 assigns predetermined information specifying the terminal 40 and a sequence number according to the predetermined information to a packet, which is received by the counter router 20, using the terminal 40 as the destination. The predetermined information may be information specifying a line between the terminal 40 and the counter router 20. For example, the assigning unit 231 assigns NAS-PORT information in between the terminal 40 and an edge router accommodating the terminal 40 and a sequence number according to the NAS-PORT information. The INT information is information in which the predetermined information, the sequence number, and the timestamp are combined.

The deletion unit 232 deletes the information assigned to the packet. For example, the deletion unit 232 deletes the INT information assigned to the packet. Note that the information deleted from the packet by the deletion unit 232 may be used in other processing units of the counter router 20.

The storage unit 233 stores, in the aggregation server 30, the predetermined information and the sequence numbers assigned to the packets which are transferred by the subscriber accommodation router 10 and received by the counter router 20.

The transfer unit 234 transfers the packets to which the predetermined information and sequence numbers are assigned by the counter router 20, from the counter router 20 to the subscriber accommodation router 10 via the relay router 50.

Figure 5:
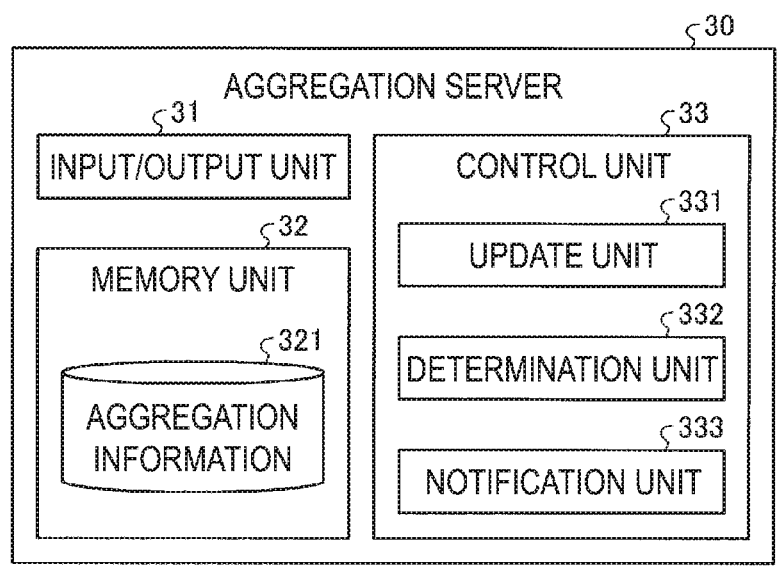
FIG. 5 is a diagram illustrating a configuration example of an aggregation server according to the first embodiment.

The configuration of the aggregation server 30 will be described using FIG. 5. FIG. 5 is a diagram illustrating a configuration example of the aggregation server according to the first embodiment. As illustrated in FIG. 5, the aggregation server 30 includes an input/output unit 31, a memory unit 32, and a control unit 33.

The input/output unit 31 exchanges data with other apparatuses. For example, the input/output unit 31 receives INT information from the subscriber accommodation router 10 and the counter router 20. For example, the input/output unit 31 is an NIC.

The memory unit 32 is a storage device such as a HDD, an SSD, or an optical disk. Note that the memory unit 32 may be a semiconductor memory capable of rewriting data, such as a RAM, a flash memory, or an NVSRAM. The memory unit 32 stores OS and various programs executed by the counter router 20. Further, the memory unit 32 stores various types of information used in the execution of the program, The memory unit 32 stores aggregation information 321. An example of the data configuration of the aggregation information 321 is illustrated in FIG. 2.

The control unit 33 controls the entire aggregation server 30. The control unit 33 is, for example, an electronic circuit such as a CPU, and an MPU, or an integrated circuit such as an ASIC, and a FPGA. The control unit 33 includes an internal memory for storing programs defining various processing procedures and control data, and executes each of the processes by using the internal memory. Further, the control unit 33 functions as various processing units by operating various programs. For example, the control unit 33 includes an update unit 331, a determination unit 332, and a notification unit 333.

The update unit 331 updates the aggregation information 321, according to the storage process by the subscriber accommodation router 10 and the counter router 20. Further, the determination unit 332 determines whether a difference between the sequence number being stored by the subscriber accommodation router10 and the counter router 20 and the sequence number which has been stored in the aggregation information 321 is a specific predetermined value. The notification unit 333 notifies the administrator or its equivalent of the results of the determination by the determination unit 332. In particular, in a case where the determination unit 332 determines that the difference between the sequence numbers is not a specific value, the notification unit 333 notifies the alert that packet loss has occurred. For example, in a case where the sequence number is incremented by one at a time, the specific value is 1.

Processing in First Embodiment

Figure 6:
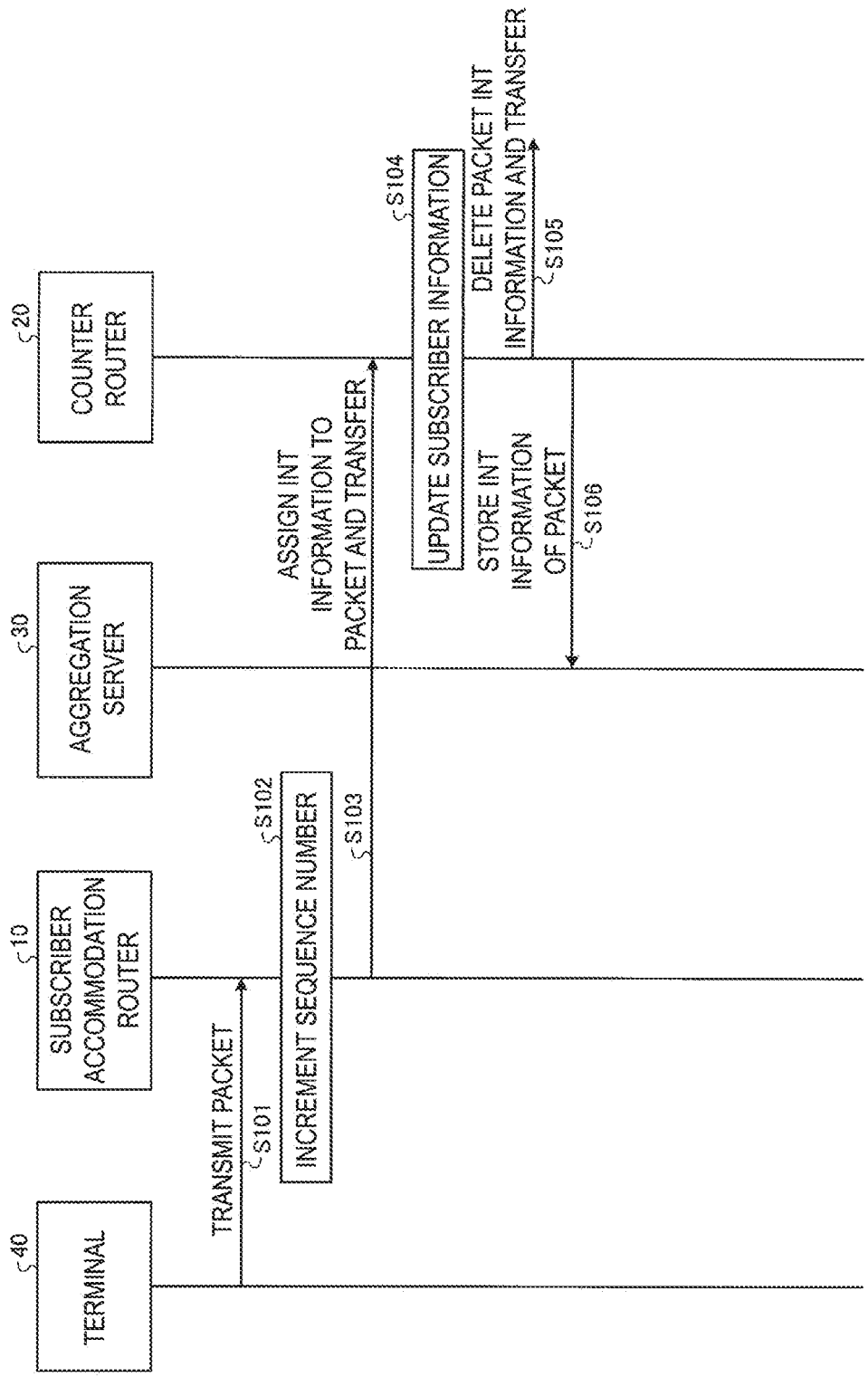
FIG. 6 is a sequence diagram illustrating a flow of the processing on uplink traffic in the information collection system according to the first embodiment.

The flow of the processing on the uplink traffic in the information collection system 1 will be described using FIG. 6. FIG. 6 is a sequence diagram illustrating a flow of the processing on uplink traffic in the information collection system according to the first embodiment.

As illustrated in FIG. 6, first, the terminal 40 transmits a packet to the subscriber accommodation router 10 (step S101). Here, when receiving the packet transmitted from the terminal 40, the subscriber accommodation router 10 increments the sequence number corresponding to the line information between the terminal 40 and the subscriber accommodation router 10 (step S102).

Next, the subscriber accommodation router 10 assigns INT information including the sequence number before increment to the packet transmitted from the terminal 40, and transfers the packet to which the INT information is assigned, to the counter router 20 via the relay device (step S103).

Here, the counter router 20 stores line information acquired from the packet transferred by the subscriber accommodation router 10 and the source IP address of the packet in association with each other in the memory unit 22 to update the subscriber information 221 (step S104). Then, the counter router 20 transfers the packet with INT information deleted to the external network 3 (step S105). In addition, the counter router 20 stores the deleted INT information in the aggregation server 30 (step S106).

Figure 7:
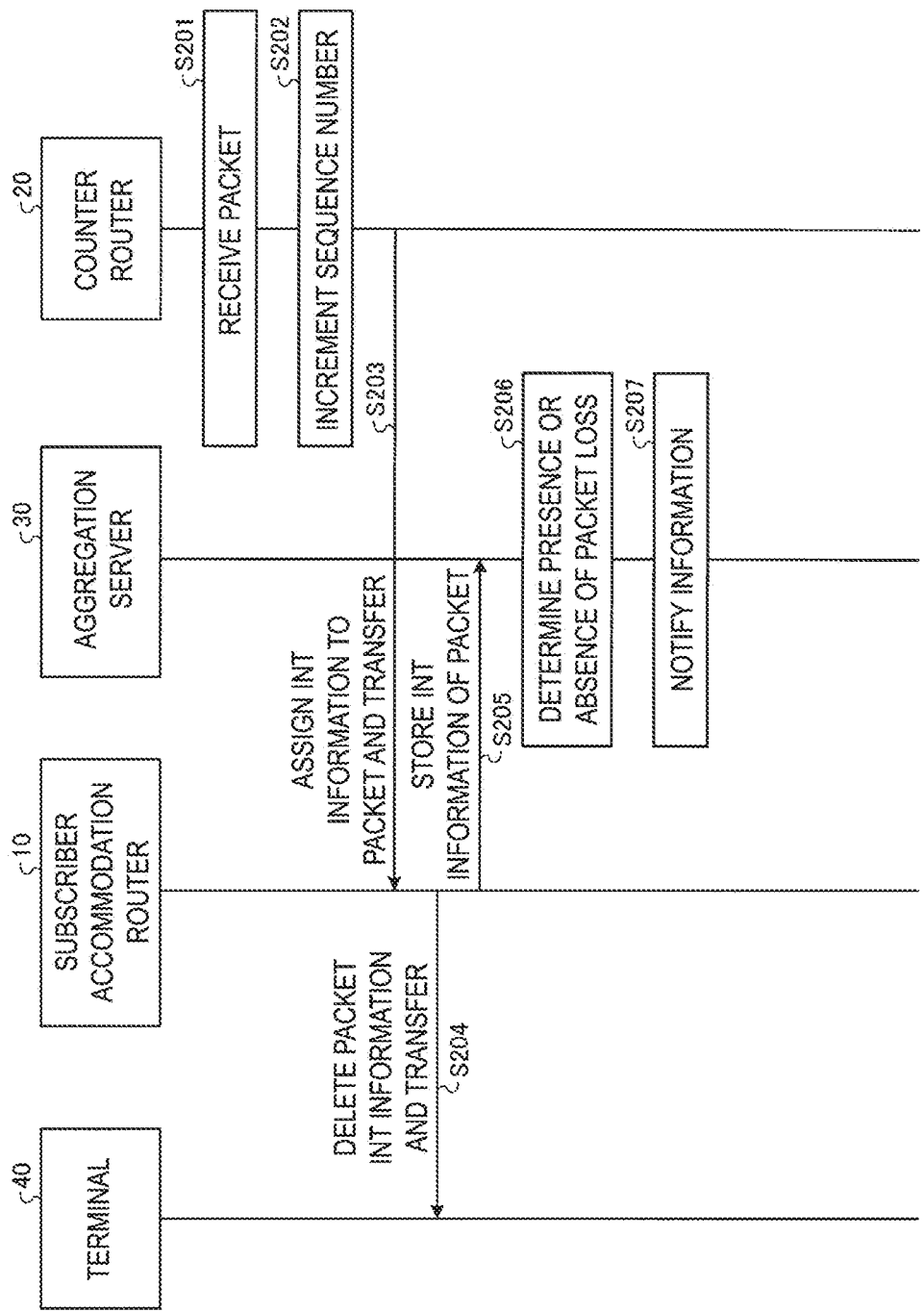
FIG. 7 is a sequence diagram illustrating a flow of the processing on downlink traffic in the information collection system according to the first embodiment.

The flow of the processing on the downlink traffic in the information collection system 1 will be described using FIG. 7. FIG. 7 is a sequence diagram illustrating a flow of the processing on downlink traffic in the information collection system according to the first embodiment.

As illustrated in FIG. 7, first, the counter router 20 receives packets from the external network 3 (step S201). Here, when receiving the packet, the counter router 20 specifies the line information of the terminal 40 from the IP address of the packet with reference to the memory unit and increments the sequence number corresponding to the line information between the terminal 40 and the subscriber accommodation router 10 (step S202).

Next, the counter router 20 assigns INT information including the sequence number before increment to the received packet, and transfers the packet to which the INT information is assigned, to the subscriber accommodation router 10 via the relay device (step S203).

Then, the subscriber accommodation router 10 transfers the packet with INT information deleted to the terminal 40 (step S204). In addition, the counter router 20 stores the deleted INT information in the aggregation server 30 (step S205).

The aggregation server 30 determines the presence or absence of packet loss based on the sequence number (step S206). Then, the aggregation server 30 notifies the administrator or its equivalent of information regarding the presence or absence of packet loss (step S207).

Effect of First Embodiment

The information collection system 1 has a first edge router and a second edge router to collect information on a network accommodating the terminal 40 of the user. In the embodiment, the first and second edge routers may be the subscriber accommodation router 10 and the counter router 20, respectively. Further, conversely, the first and second edge routers may be the counter router 20 and the subscriber accommodation router 10, respectively.

The assigning unit 131 assigns predetermined information specifying the terminal 40 and a sequence number according to the predetermined information to a packet, which is received by the subscriber accommodation router 10, using the terminal 40 as the source. Further, the transfer unit 134 transfers the packets to which the predetermined information and the sequence numbers are assigned by the assigning unit 131, from the subscriber accommodation router 10 to the counter router 20 via, the relay device. The storage unit 233 stores, in the aggregation server 30, the predetermined information and the sequence numbers assigned to the packets which are transferred by the transfer unit 134 and received by the counter router 20. In this manner, in the present embodiment, the packet in the uplink traffic is managed by using the sequence number for each subscriber. Thus, according to the present embodiment, it is possible to easily understand the status of packet loss for each subscriber in uplink traffic.

The assigning unit 231 assigns predetermined information specifying the terminal 40 and a sequence number according to the predetermined information to a packet, which is received by the counter router 20, using the terminal 40 as the destination. Further, the transfer unit 234 transfers the packets to which the predetermined information and the sequence numbers are assigned by the assigning unit 231, from the counter router 20 to the subscriber accommodation router 10 via the relay device. The storage unit 133 stores, in the aggregation server 30, the predetermined information and the sequence numbers assigned to the packets which are transferred by the transfer unit 234 and received by the subscriber accommodation router 10. In this manner, in the present embodiment, the packet in the downlink traffic is managed by using the sequence number for each subscriber. Thus, according to the present embodiment, it is possible to easily understand the status of packet loss for each subscriber in downlink traffic.

The assigning unit 131 and the assigning unit 231 assign NAS-PORT information in between the terminal 40 and an edge router accommodating the terminal 40 and a sequence number according to the NAS-PORT information. This makes it possible to specify the subscriber by using NAS-PORT information, even in a case where the IP address of the terminal 40 of the subscriber changes.

The determination unit 332 determines whether a difference between the sequence number being stored by the storage unit 133 or the storage unit 233 and the sequence number that has been stored by the storage unit 133 or the storage unit 233 is a specific predetermined value. This makes it possible to easily detect the occurrence of packet loss.

Second Embodiment

In the first embodiment, the counter router stores the line information and the subscriber IP address in association with each other, and specifies line information from the destination IP address of the received packet. On the other hand, in the second embodiment, in order to reduce the resource usage amount of the counter router, the counter router does not store line information.

Configuration of System of Second Embodiment

In the first and second embodiments, the configurations of the counter router and the processes associated with the counter router are different. Hereinafter, descriptions of common parts of the first embodiment and the second embodiment will be omitted as appropriate, and the difference will be mainly described.

Figure 8:
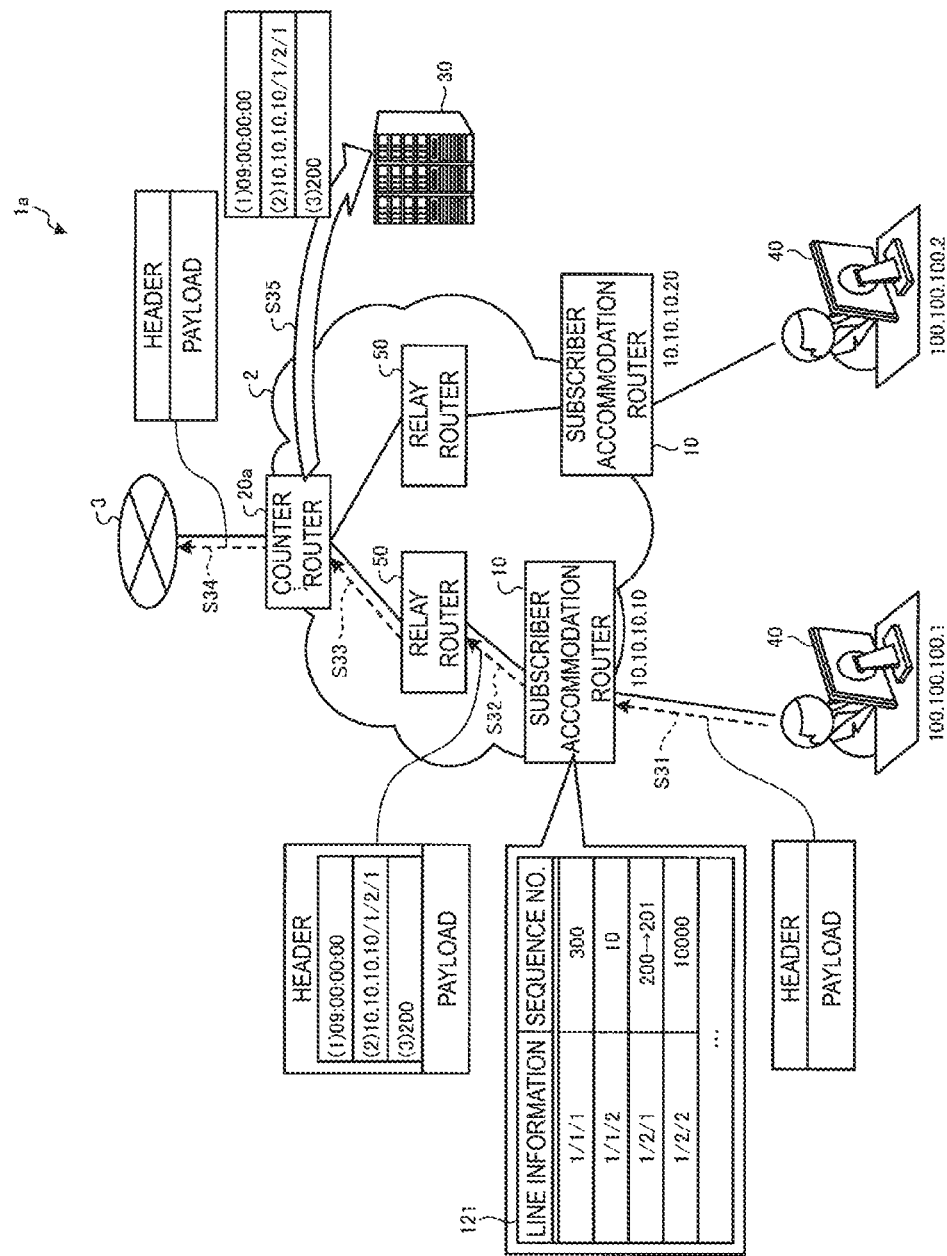
FIG. 8 is a diagram illustrating processing on uplink traffic in an information collection system according to a second embodiment.

First, a configuration of an information collection system according to a second embodiment will be described using FIG. 8. As illustrated in FIG. 8, the information collection system 1a has a subscriber accommodation router 10 and a counter router 20a that are edge routers of the network 2.

Processing on Uplink Traffic in Second Embodiment

Here, processing on uplink traffic in the information collection system 1a will be described using FIG. 8. FIG. 8 is a diagram illustrating processing on uplink traffic in the information collection system according to the second embodiment.

As illustrated in FIG. 8, first, the terminal 40 transmits a packet to the subscriber accommodation router 10 (step S31). Here, the subscriber accommodation router 10 refers to line information between the terminal 40 and the subscriber accommodation router 10, and increments the sequence number according to the line information. In the example of FIG. 8, the subscriber accommodation router 10 specifies that NAS-PORT information in between the source terminal 40 of the transmitted packet and the subscriber accommodation router 10 is "1/2/1" and increments the sequence number from "200" to "201".

Then, the subscriber accommodation router 10 assigns the sequence number before increment to the packet together with timestamp and line information, and transfers the packet to the counter router 20a (step S32). The relay router 50 transfers the packet that has been transferred from the subscriber accommodation router 10 to the counter router 20a (step S33).

Here, the counter router 20a then deletes the INT information from the packet and transfers it to the network 3 (step S34). In addition, the counter router 20a stores the INT information assigned to the packet in the aggregation server 30 (step S35). At this time, the counter router 20a does not store subscriber information 221. unlike the counter router 20 of the first embodiment.

Processing on Downlink Traffic in Second Embodiment

Figure 9:
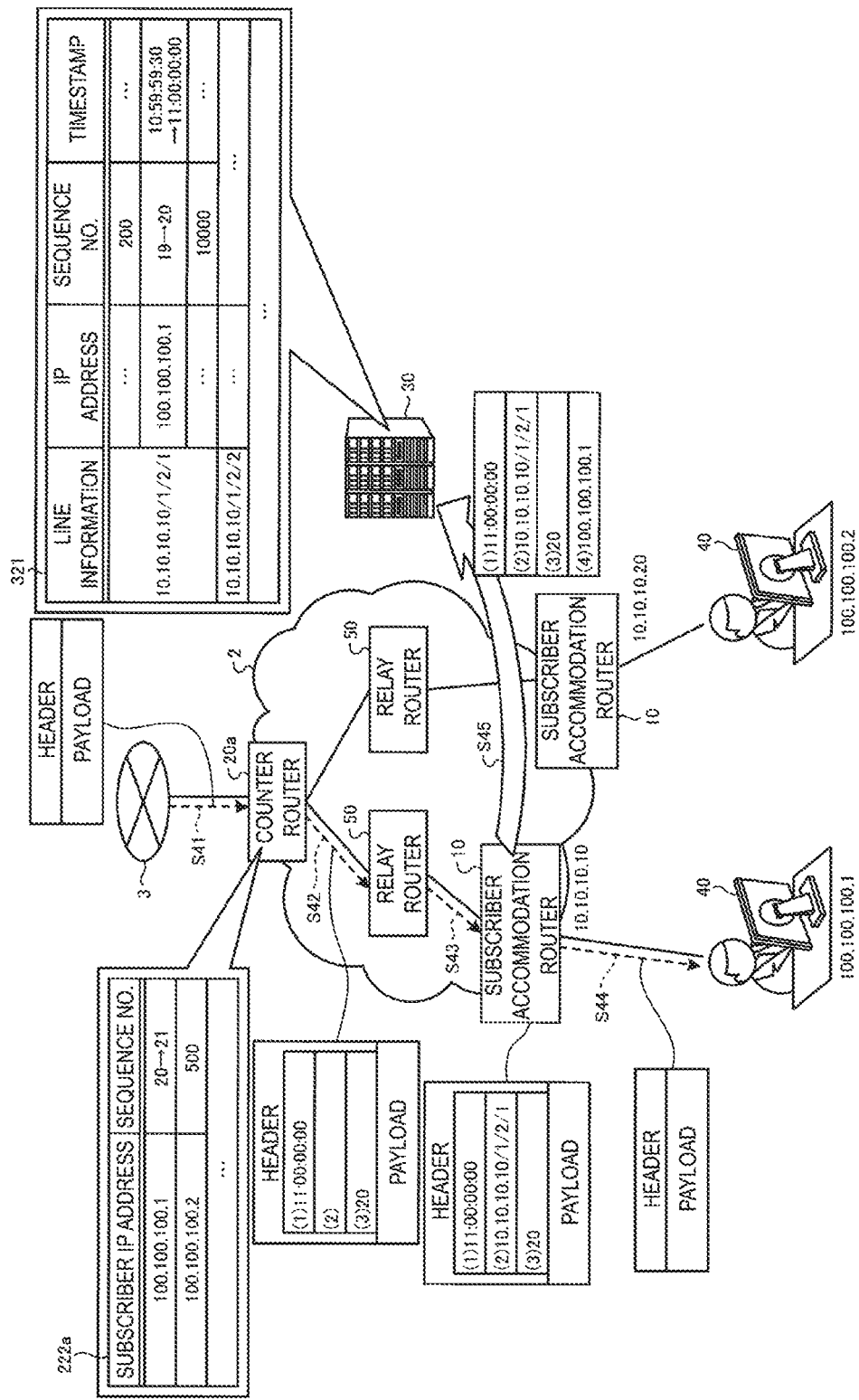
FIG. 9 is a diagram illustrating processing on downlink traffic in the information collection system according to the second embodiment.

Next, processing on downlink traffic in the information collection system 1 will be described using FIG. 9. FIG. 9 is a diagram illustrating processing on downlink traffic in the information collection system according to the second embodiment.

As illustrated in FIG. 9, first, the counter router 20a receives packets from the network 3 (step S41) Then, the counter router 20a increments the sequence number corresponding to the destination IP address of the received packet.

Here, the counter router 20a assigns a part of the INT information to the packet and transfers it to the subscriber accommodation router 10 (step S42). In the example of FIG. 2, the counter router 20a, as a part of the INT information, assigns a timestamp "11:00:00:00" and a sequence number "20" to the header of the packet. At this time, the counter router 20a does not assign line information, unlike the counter router 20 of the first embodiment.

The relay router 50 further transfers the packet that has been transferred from the counter router 20 to the subscriber accommodation router 10 (step S43). Then, the subscriber accommodation router 10 adds line information to the packets that have been transferred, completes INT information, deletes INT information, and transfers it to the terminal 40 (step S44). In addition, the subscriber accommodation router 10 adds the IP address of the terminal 40 to the completed INT information and stores the packet in the aggregation server 30 (step S45).

The aggregation server 30 stores the transferred INT information and the IP address of the terminal 40 as aggregation information 321. The aggregation server 30 can update the registered INT information with the sequence number and timestamp of INT information received from the counter router 20a or the subscriber accommodation router 10.

The aggregation server 30 may determine whether or not the sequence number of INT information received from the counter router 20a or the subscriber accommodation router 10 is continuous with the registered sequence number. In the case of a determination that the sequence number is not continuous, the aggregation server 30 may estimate that packet loss may have occurred and notify the administrator or its equivalent of the alert.

Here, processing of the aggregation server 30 when the line information of the terminal 40 has changed will be described using FIG. 10. As illustrated in the upper portion of FIG. 10, it is assumed that the aggregation information 321 includes a record in which the line information is "10.10.10./1/2/2", the IP address is "100.100.100.1", the sequence number is "19", and the timestamp is "10:59:59: 30".

Then, it is assumed that record has been transmitted in which the line information is "10.10.1011/2/1", the IP address is "100.100.100.1" from the subscriber accommodation router 10, the sequence number is "20", and the timestamp is "11:00:00:00". In this case, the aggregation information 321 has no record whose line information and IP address matching the record transmitted from the subscriber accommodation router 10, but has a record whose only IP address matching the transmitted record.

Figure 10:
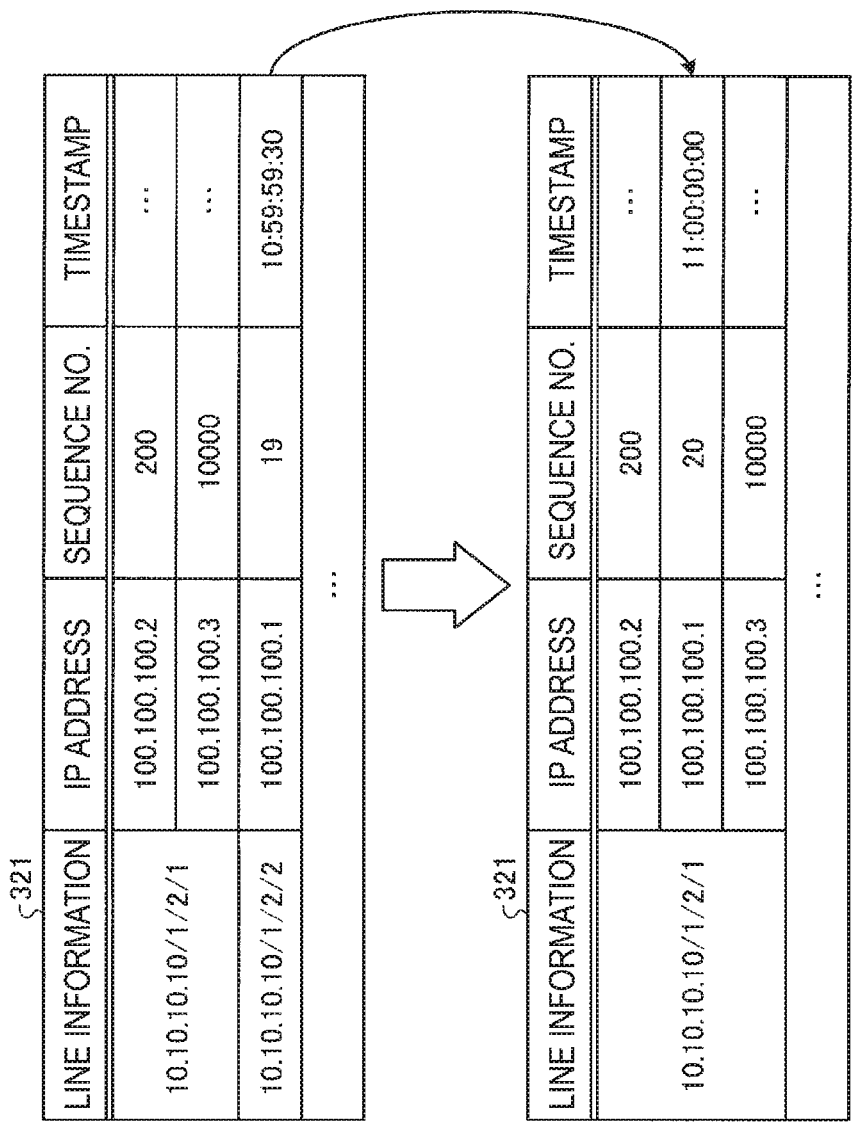
FIG. 10 is a diagram illustrating processing on changing line information of an information collection system according to the second embodiment.

In this case, as illustrated in the lower portion of FIG. 10, the aggregation server 30 considers that the IP address has not changed and the line information has changed, and updates the existing record having matching IP address with the record that has been transmitted.

Configuration of Each Apparatus in Second Embodiment

Figure 11:
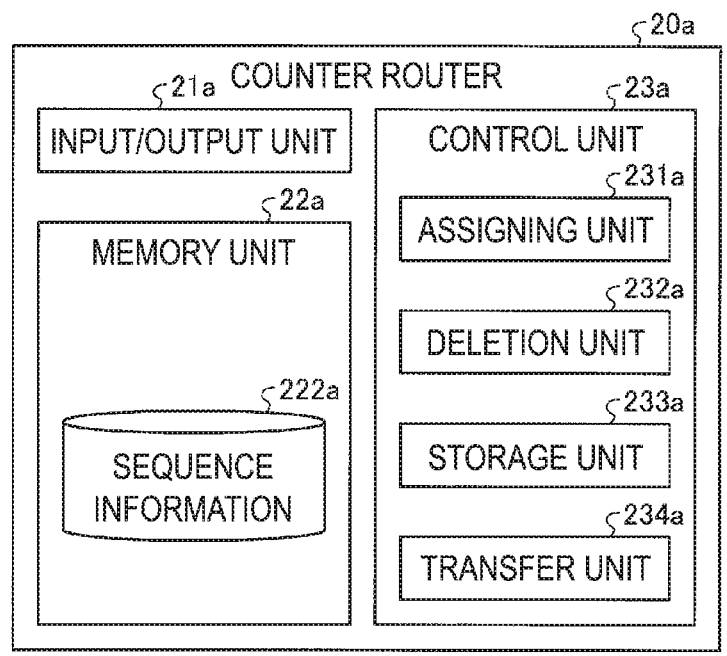
FIG. 11 is a diagram illustrating a configuration example of a counter router according to the second embodiment.

The configuration of the counter router 20a will be described using FIG. 11. FIG. 11 is a diagram illustrating a configuration example of the counter router according to the second embodiment. As illustrated in FIG. 11, the counter router 20a includes an input/output unit 21a, a memory unit 22a, and a control unit 23a.

The input/output unit 21a and the control unit 23a each have functions similar to the functions of the input/output unit 21 and the control unit 23 of the counter router 20 of the first embodiment. On the other hand, unlike the memory unit 22 of the counter router 20 of the first embodiment, the memory unit 22a does not store subscriber information 221.

Processing in Second Embodiment

Figure 12:
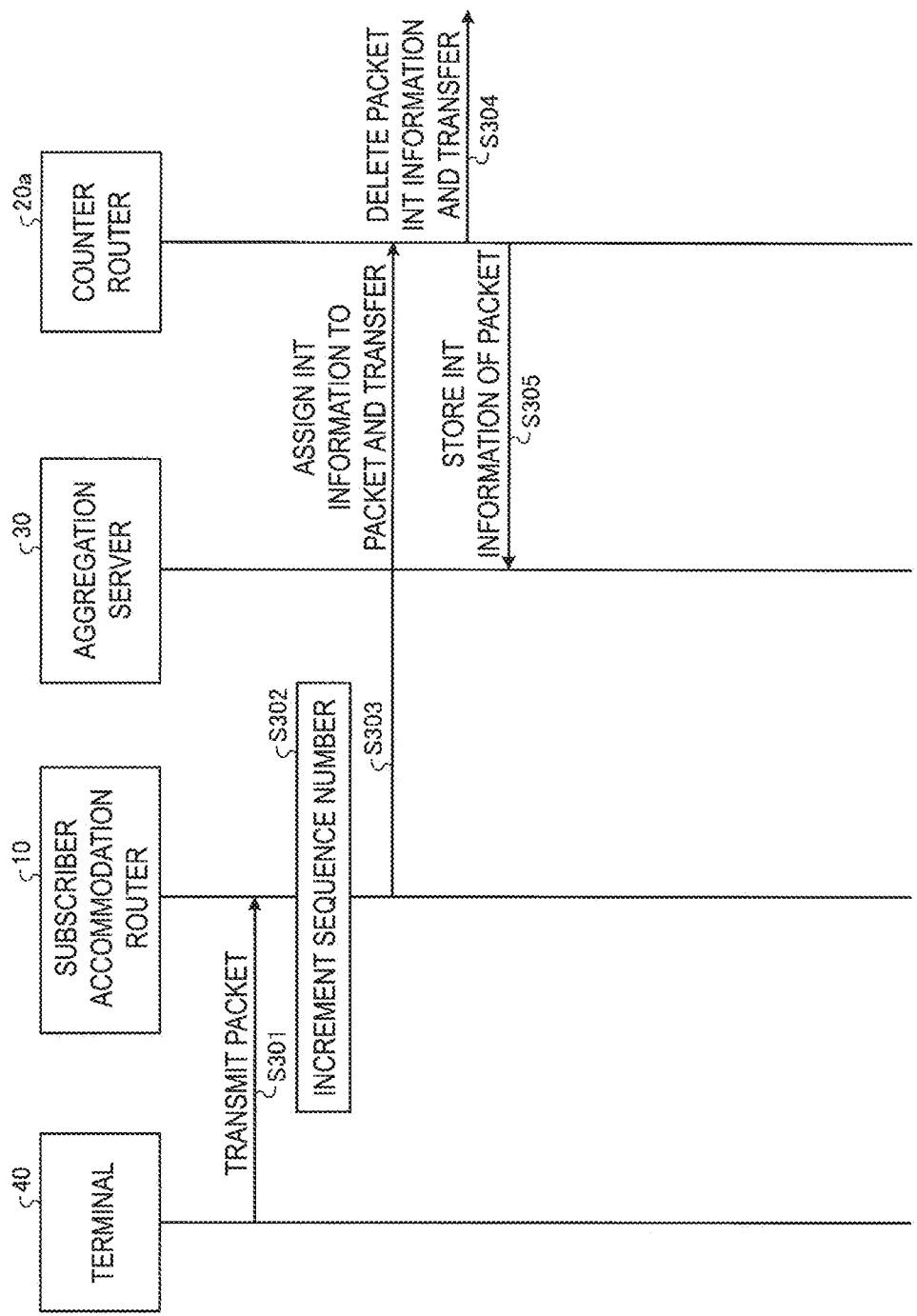
FIG. 12 is a sequence diagram illustrating a flow of the processing on uplink traffic in the information collection system according to the second embodiment.

The flow of the processing on the uplink traffic in the information collection system 1a will be described using FIG. 12. FIG. 12 is a sequence diagram illustrating a flow of the processing on uplink traffic in the information collection system according to the second embodiment.

As illustrated in FIG. 12, first, the terminal 40 transmits a packet to the subscriber accommodation router 10 (step S301). Here, when receiving the packet transmitted from the terminal 40, the subscriber accommodation router 10 increments the sequence number corresponding to the line information between the terminal 40 and the subscriber accommodation router 10 (step S302).

Next, the subscriber accommodation router 10 assigns INT information including the sequence number before increment to the packet transmitted from the terminal 40, and transfers the packet to which the INT information is assigned, to the counter router 20a via the relay device (step S303).

Here, the counter router 20a stores line information acquired from the packet transferred by the subscriber accommodation router 10 and the source IP address of the packet in association with each other in the memory unit 22 to update the subscriber information 221 (step S304). Then, the counter router 20a transfers the packet with INT information deleted to the external network 3 (step S305). In addition, the counter router 20a stores the deleted INT information in the aggregation server 30 (step S306).

Figure 13:
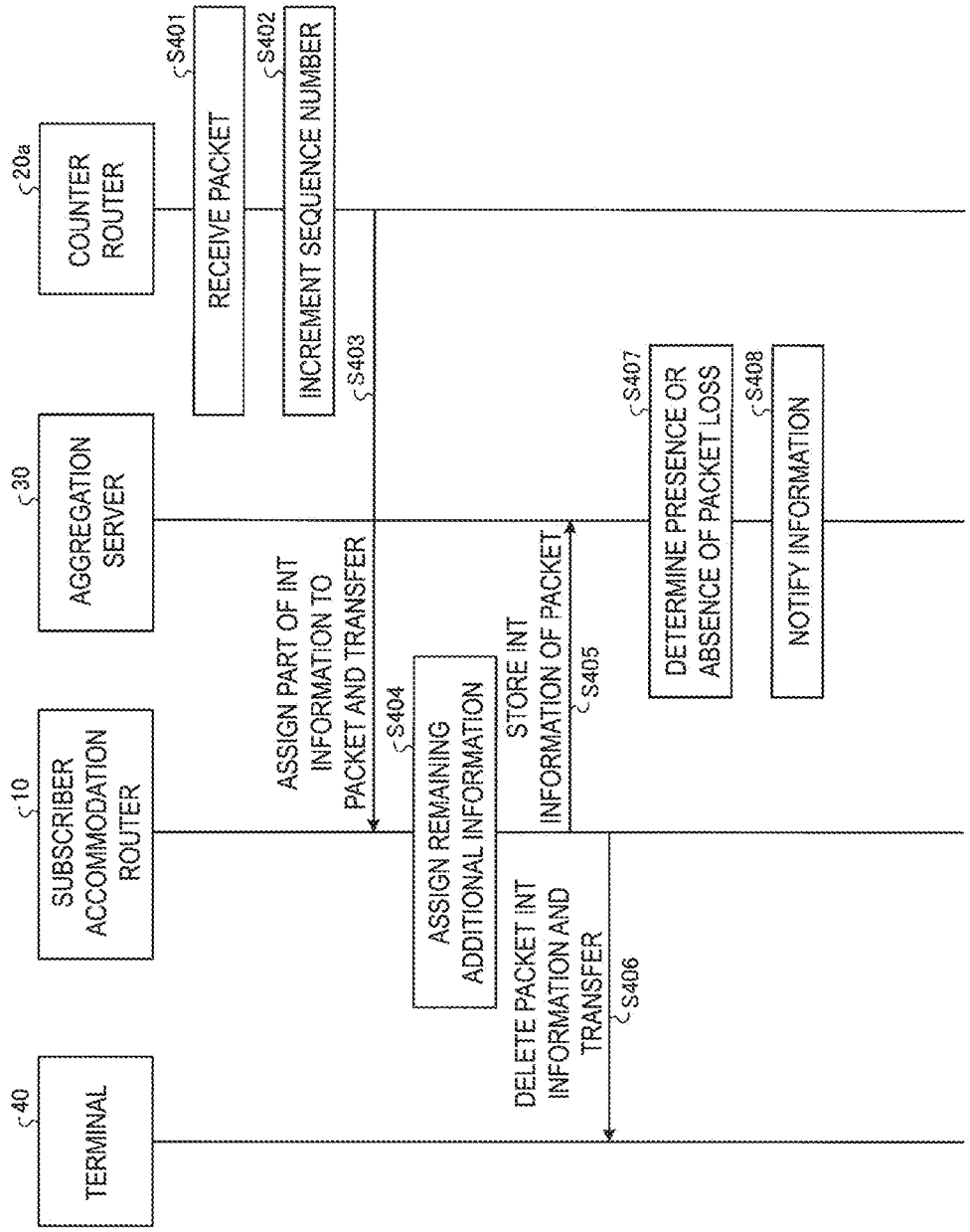
FIG. 13 is a sequence diagram illustrating a flow of the processing on downlink traffic in the information collection system according to the second embodiment.

The flow of the processing on the downlink traffic in the information collection system 1a will be described using FIG. 13. FIG. 13 is a sequence diagram illustrating a flow of the processing on downlink traffic in the information collection system according to the second embodiment.

As illustrated in FIG. 13, first, the counter router 20a receives packets from the external network 3 (step S401). Here, when receiving the packet, the counter router 20a specifies the line information of the terminal 40 from the IP address of the packet with reference to the memory unit and increments the sequence number corresponding to the line information between the terminal 40 and the subscriber accommodation router 10 (step S402).

Next, the counter router 20a assigns a part of the INT information including the sequence number before increment to the received packet, and transfers the packet to which the INT information is assigned, to the subscriber accommodation router 10 via the relay device (step S403) Here, unlike the first embodiment, the counter router 20a does not assign line information to the packet.

Then, the subscriber accommodation router 10 completes INT information by adding line information to the packets that have been transferred (step S404), adds the IP address of the terminal 40 to the completed INT information, and stores it in the aggregation server 30 (step S405). Further, the subscriber accommodation router 10 deletes the INT information and transfers the packet with INT information deleted to the terminal 40 (step S406).

The aggregation server 30 determines the presence or absence of packet loss based on the sequence number (step S407). Then, the aggregation server 30 notifies the administrator or its equivalent of information regarding the presence or absence of packet loss (step S408).

Effect of Second Embodiment

In a second embodiment, the counter router does not store subscriber line information. Thus, according to the second embodiment, the usage amount of the storage area of the counter router can be reduced. Further, in the second embodiment, the counter router does not perform line information searching and assigning, so that the processing load on the counter router can be reduced.

System Configuration and Others

Further, each illustrated component of each apparatus is functional and does not necessarily need to be physically configured as illustrated in the drawing. In other words, the specific form of distribution and integration of each apparatus is not limited to the form illustrated in the drawings, and all or a part of the apparatuses can be distributed or integrated functionally or physically in any unit, depending on various loads, and usage conditions. Further, all or any part of each processing function to be performed in each apparatus can be realized by the CPU and a program being analyzed and executed by the CPU, or can be realized as hardware by wired logic.

In addition, all or some of the processes described as being performed automatically among the processes described in the present embodiment can be performed manually, or all or some of the processes described as being performed manually can be performed automatically by a known method. In addition, the processing procedures, control procedures, specific names, and information including various types of data and parameters illustrated in the above documents and drawings can be modified as desired except in the case of the special description.

Program

As an embodiment, a subscriber accommodation router and a counter router (hereinafter, an edge router) can be implemented by installing, on a desired computer, a search program that executes the above-described search as package software or online software. For example, by causing an information processing apparatus to execute the above-described search program, the information processing apparatus can function as an edge router. The information processing apparatus herein includes a desktop or notebook personal computer, in addition to a network device such as a switch, and router. In addition, as the information processing apparatus, a mobile communication terminal such as a smart phone, a mobile phone, and a Personal Handyphone System (PHS), or a smart terminal such as Personal Digital Assistant (PDA) are included in the category.

FIG. 14 is a diagram illustrating an example of a computer executing an information collection program. The computer 1000 has, for example, a memory 1010, and a CPU 1020. The computer 1000 also has a hard disk drive interface 1030, a disk drive interface 1040, a serial port interface 1050, a video adapter 1060, and a network interface 1070. These units are connected by a bus 1080.

The memory 1010 includes a Read Only Memory (ROM) 1011 and a RAM 1012. The ROM 1011 stores a boot program, such as Basic input Output System (BIOS), for example. The hard disk drive interface 1030 is connected to a hard disk drive 1090. The disk drive interface 1040 is connected to the disk drive 1100. A removable storage medium, such as a magnetic disk or optical disk, for example, is inserted into the disk drive 1100. The serial port interface 1050 is connected to, for example, a mouse 1110 and a keyboard 1120. The video adapter 1060 is connected to the display 1130, for example.

The hard disk drive 1090 stores an OS 1091, an application program 1092, a program module 1093, and program data 1094, for example. That is, a program defining each process of an edge router is implemented as a program module 1093 in which computer executable code is described. The program module 1093 is stored, for example, in the hard disk drive 1090. For example, the program module 1093 for executing processing similar to the functional configuration in an edge router is stored in the hard disk drive 1090. Note that the hard disk drive 1090 may be replaced with an SSD.

The configuration data used in the processing of the above-described embodiments is stored, for example, in the memory 1010 and the hard disk drive 1090 as the program data 1094. The CPU 1020 reads the program module 1093 and the program data 1094 stored in the memory 1010 and the hard disk drive 1090 into the RAM 1012 as necessary, and executes the process of the above-described embodiments.

Note that the program module 1093 and the program data 1094 are not limited to being stored in the hard disk drive 1090, and may be stored, for example, in a removable storage medium, and read by the CPU 1020 via a disk drive 1100 or its equivalent. Alternatively, the program module 1093 and the program data 1094 may be stored in other computers connected via a network (a Local Area Network (IAN), and a Wide Area Network (WAN)). The program module 1093 and the program data 1094 may then be read by the CPU 1020 from other computers via the network interface 1070.

REFERENCE SIGNS LIST 1, 1a Information collection system
2, 3 Network
10 Subscriber accommodation router
20, 20a Counter router
30 Aggregation server
40 Terminal
50 Relay router
11, 21, 21a, 31 Input/output unit
12, 22, 22a, 32 Memory Unit
13, 23, 23a, 33 Control Unit
121, 222 Sequence Information
221 Subscriber information
321 Aggregation information
131, 231 Assigning unit
132, 232 Deletion Unit
133, 233 Storage Unit
134, 234 Transfer Unit
331 Update unit
332 Determination unit
333 Notification unit

The invention claimed is:

1. An information collection system having a first edge router and a second edge router, the information collection system being configured to collect information on a network accommodating a terminal of a user, the information collection system comprising:

an assigning unit, implemented using one or more computing devices, configured to assign, to a first packet received by the first edge router, line information specifying the terminal and a first sequence number according to the line information, the first packet having the terminal as a source or a destination;

a transfer unit, implemented using one or more computing devices, configured to transfer the first packet to which the line information and the first sequence number are assigned by the assigning unit, from the first edge router to the second edge router via a relay device;

a storage unit configured to store, in a memory unit, the line information and the first sequence number assigned to the first packet, which is transferred by the transfer unit and received by the second edge router; and a determination unit, implemented using one or more computing devices, configured to determine whether a difference between the first sequence number being stored by the storage unit and a stored sequence number of the line information is a specific predetermined value.

2. The information collection system according to claim 1, wherein the assigning unit is configured to assign port information in between the terminal and an edge router accommodating the terminal and the first sequence number according to the port information.

3. The information collection system according to claim 1, wherein the assigning unit is configured to increment the first sequence number according to the line information after assigning the first sequence number to the first packet.

4. The information collection system according to claim 1, wherein the assigning unit is configured to assign, to a second packet received from an external network, the line information stored in the memory unit in association with a destination IP address of the second packet and a second sequence number according to the line information,
wherein the transfer unit is configured to transfer, from the second edge router to the first edge router via the relay device, the second packet to which the line information and the second sequence number are assigned, and
wherein the storage unit is configured to store, in the memory unit, the line information and the second sequence number assigned to the transferred packet.

5. The information collection system according to claim 4, wherein the determination unit is configured to determine whether a difference between the first sequence number and the second sequence number is a specific predetermined value.

6. The information collection system according to claim 5, further comprising:
a notification unit, implemented using one or more computing devices, configured to generate an alert based on a determination that the difference is not the specific predetermined value.

7. An information collection method executed by an information collection system having a first edge router and a second edge router, the method comprising:
assigning, to a first packet received by the first edge router, line information specifying a terminal and a first sequence number according to the line information, the first packet having the terminal as a source or a destination;
transferring, from the first edge router to the second edge router via a relay device, the first packet to which the line information and the first sequence number are assigned;
storing, in a memory unit, the line information and the first sequence number assigned to the first packet, which is transferred and received by the second edge router; and
determining whether a difference between the stored first sequence number and a previously stored sequence number of the line information is a specific predetermined value.

8. The information collection method according to claim 7,
wherein assigning the line information and the first sequence number comprises assigning port information in between the terminal and an edge router accommodating the terminal and a first sequence number according to the port information.

9. The information collection method according to claim 7, further comprising incrementing the first sequence number according to the line information after assigning the first sequence number to the first packet.

10. The information collection method according to claim 7, further comprising:
assigning, to a second packet received from an external network, the line information stored in the memory unit in association with a destination IP address of the second packet and a second sequence number according to the line information;
transferring, from the second edge router to the first edge router via the relay device, the second packet to which the line information and the second sequence number are assigned; and
storing, in the memory unit, the line information and the second sequence number assigned to the transferred packet.

11. The information collection method according to claim 10, wherein determining the difference comprises determining whether a difference between the first sequence number and the second sequence number is a specific predetermined value.

12. The information collection method according to claim 11, further comprising generating an alert based on a determination that the difference is not the specific predetermined value.

13. An information collection method executed by an information collection system configured to collect information on an IP network having a subscriber accommodation router accommodating a terminal of a user and a counter router facing an external network, the method comprising:
assigning, by the subscriber accommodation router and to a packet transmitted from the terminal, (i) line information in between the terminal and the subscriber accommodation router and (ii) a sequence number according to the line information;
transferring, by the subscriber accommodation router and to the counter router via a relay device, the packet to which the line information and the sequence number are assigned;
storing, in a first memory unit and by the counter router, the line information and a source IP address, both of which are acquired from the packet transferred by the subscriber accommodation router in associated with each other;
assigning, by the counter router and to a packet transmitted from the external network, the line information stored in the first memory unit in association with a destination IP address of the packet and a sequence number according to the line information;
transferring, by the counter router and to the subscriber accommodation router via a relay device, the packet to which the line information and the sequence number are assigned; and
storing, by the subscriber accommodation router and in a second memory unit, the line information and the sequence number assigned to the packet transferred by the counter router.

14. An information collection method executed by an information collection system configured to collect information on an IP network having a subscriber accommodation router accommodating a terminal of a user, and a counter router facing an external network, the method comprising:
assigning, by the counter router and to a packet transmitted from the external network, (i) a destination IP address of the packet and (ii) a sequence number according to the destination IP address;
transferring, by the counter router and to the subscriber accommodation router via a relay device, the packet to which the destination IP address and the sequence number are assigned;
storing, in a memory unit and by the subscriber accommodation router, line information in between a terminal indicated by the destination IP address assigned to the packet transferred by the counter router and the subscriber accommodation router along with the sequence number; and determining whether a difference between the stored sequence number and a previously stored sequence number of the line information is a specific predetermined value.

* * * * *